US006547206B1

(12) United States Patent
Dickie

(10) Patent No.: US 6,547,206 B1
(45) Date of Patent: Apr. 15, 2003

(54) SEAT SUSPENSION FOR WHEELCHAIR

(75) Inventor: Paul C. Dickie, Clovis, CA (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/676,207

(22) Filed: Sep. 29, 2000

(51) Int. Cl.[7] .................. F16M 13/00

(52) U.S. Cl. .................. 248/575; 248/618; 280/304.1; 297/302.1

(58) Field of Search .................. 248/576, 372.1, 248/393, 394, 397, 581, 582, 596, 618, 188.5; 297/452.18, 302.1, 325, 326, 452.49; 280/304.1, 250.1

(56) References Cited

U.S. PATENT DOCUMENTS

| | | | | | |
|---|---|---|---|---|---|
| 153,594 | A | * | 7/1874 | Miller | 248/618 |
| 226,765 | A | * | 4/1880 | Manlove, Jr. | 297/302.1 |
| 1,782,241 | A | * | 11/1930 | Marvin | 248/575 |
| 2,316,628 | A | * | 4/1943 | Schaffner | 267/102 |
| 3,829,157 | A | * | 8/1974 | Lange, Jr. | 297/263 |
| 5,004,259 | A | * | 4/1991 | Ayers et al. | 280/304.1 |
| 5,529,277 | A | * | 6/1996 | Ostaszewski | 248/603 |
| 5,947,453 | A | * | 9/1999 | Eastman et al. | 267/136 |

* cited by examiner

*Primary Examiner*—Anita King
*Assistant Examiner*—Gwendolyn Baxter
(74) *Attorney, Agent, or Firm*—MacMillan, Sobanski & Todd, LLC

(57) ABSTRACT

A wheelchair seat suspension comprises at least one substantially horizontally, disposed elongate spring. The spring is adapted to be supported by the wheelchair frame. At least a portion of the spring is adapted to support at least a portion of the seat.

6 Claims, 7 Drawing Sheets

SEAT SUSPENSION FOR WHEELCHAIR

BACKGROUND OF THE INVENTION

This invention relates in general to wheelchairs and more particularly to seat suspensions for wheelchairs. Most particularly, the invention relates to resilient seat suspensions for wheelchairs.

Wheelchair seat suspensions which absorb shock are well known. A conventional wheelchair seat suspension typically includes a single front pivot arrangement and a rear shock absorber. A common wheelchair seat suspension includes two frame members connected to one another at a pivot point. One of the frame members is permitted to pivot relative to the other frame member. The pivotal frame member is often referred to as a swing arm. Typically, one of the frame members is a seat frame member and the other frame member is a base frame member. A shock absorber is commonly positioned between the two frame members. By convention, the shock absorber is vertically oriented. The shock absorber is typically positioned beneath the seat. As a consequence, the vertical dimension of the shock absorber dictates the minimum elevation of the wheelchair seat. This may pose a problem if a low profile wheelchair configuration is desired. In addition, the shock absorber may interfere with the placement of other wheelchair components. For example, on power wheelchairs, a conventional shock absorber may interfere with the placement of drive wheel motors, batteries and the like.

What is needed is a wheelchair seat suspension that is amenable to a low profile wheelchair configuration and that is less likely to interfere with the placement of other wheelchair components.

SUMMARY OF THE INVENTION

The present invention is directed towards a wheelchair seat suspension that is amenable to a low profile wheelchair configuration and that is less likely to interfere with the placement of other wheelchair components. The seat suspension comprises at least one substantially horizontally, disposed elongate spring. The spring is adapted to be supported by the wheelchair frame. At least a portion of the spring is adapted to support at least a portion of the seat.

Various objects and advantages of this invention will become apparent to those skilled in the art from the following detailed description of the preferred embodiment, when read in light of the accompanying drawings.

DETAILED DESCRIPTION

Figure 1:
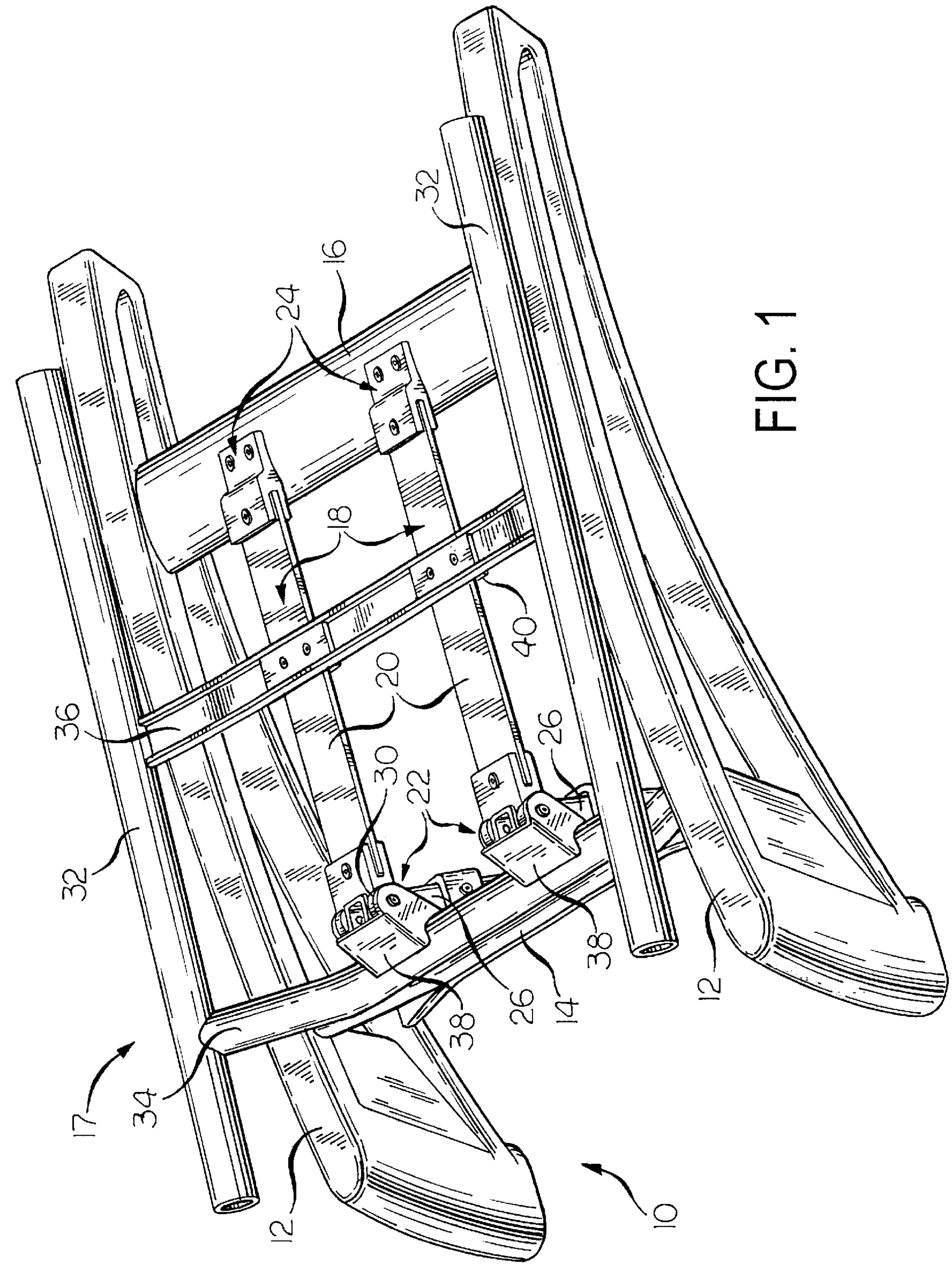
FIG. 1 is a perspective view of a base frame supporting a seat suspension.
Figure 2:
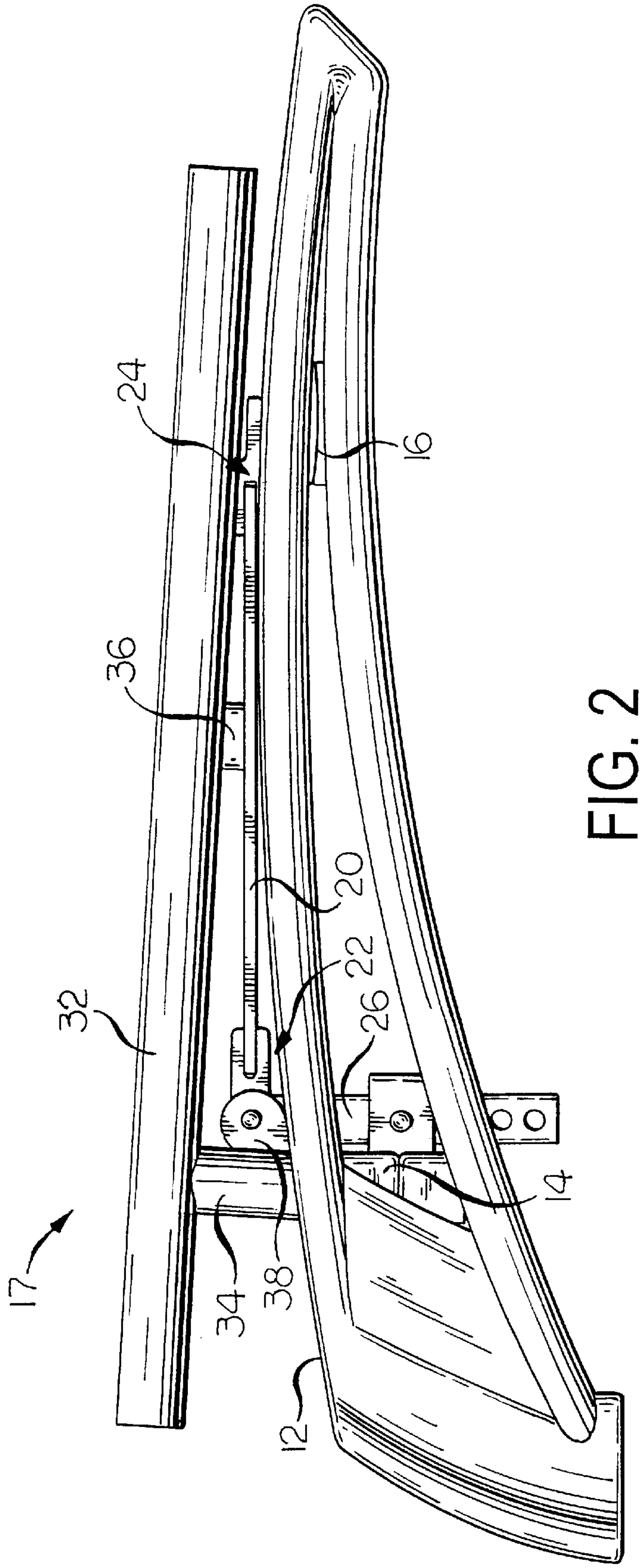
FIG. 2 is a side elevational view of the base frame and seat suspension shown in FIG. 1.
Figure 3:
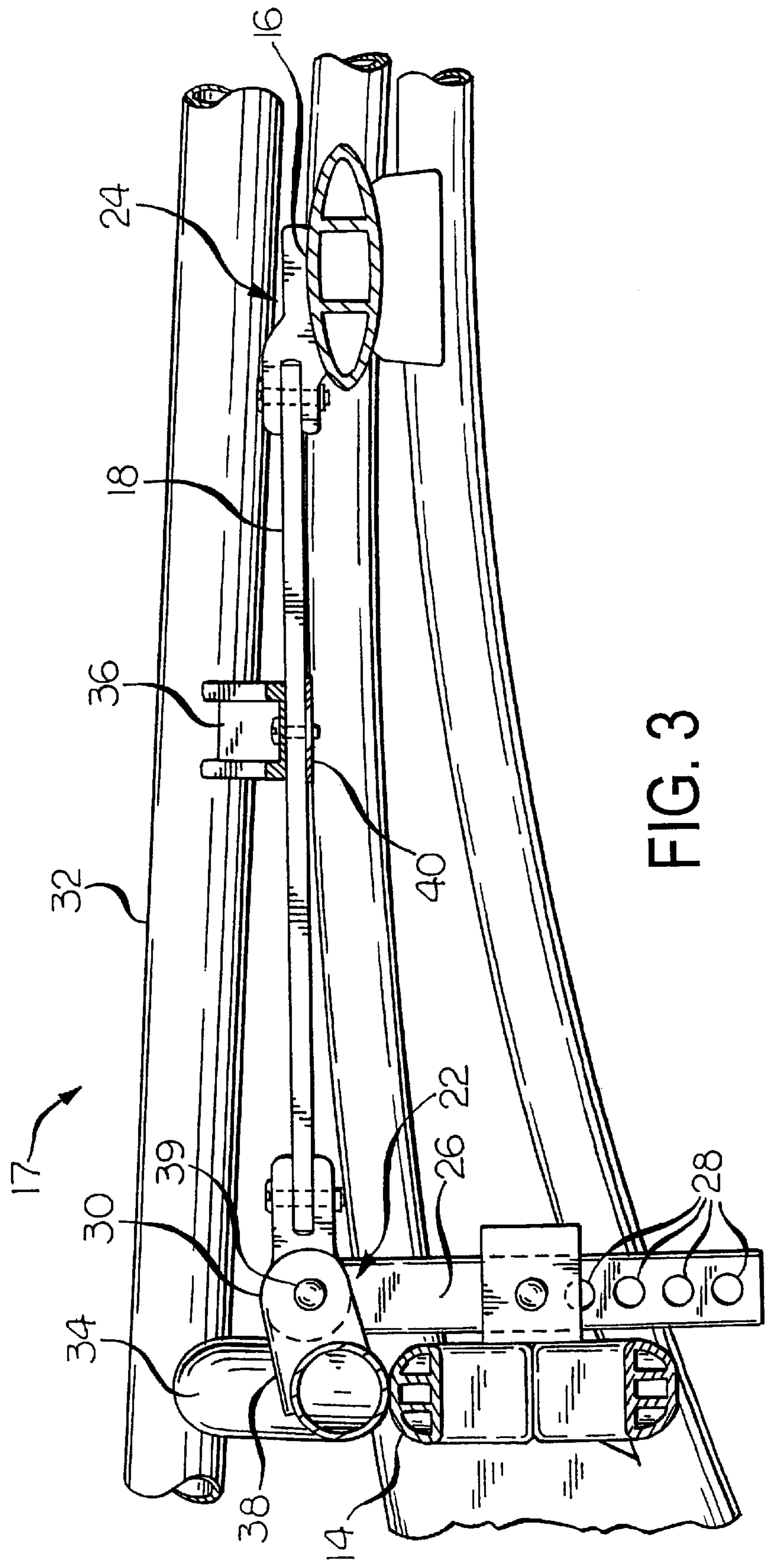
FIG. 3 is a side elevational view of the base frame and seat suspension shown in FIGS. 1 and 2.
Figure 4:
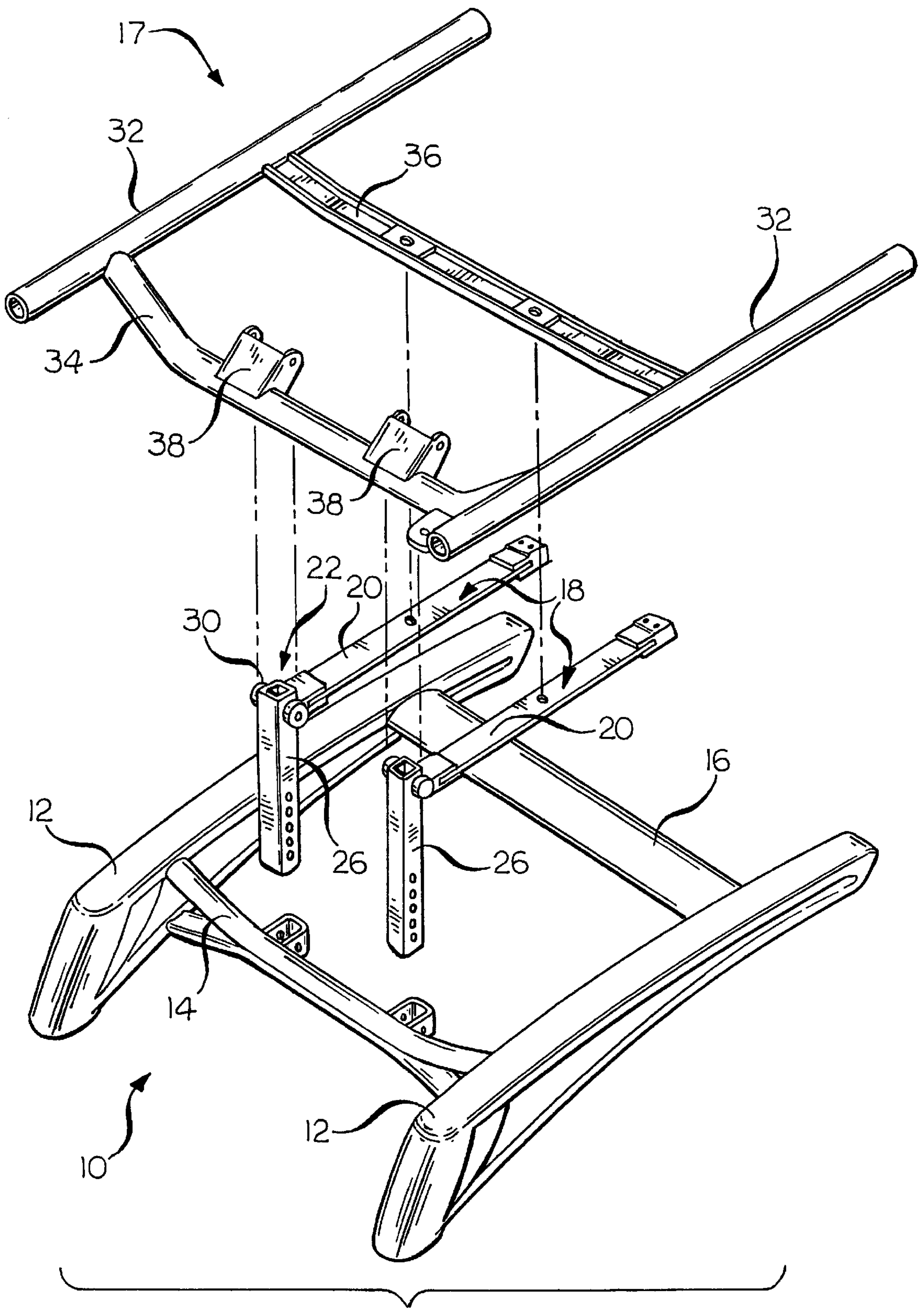
FIG. 4 is an exploded perspective view of the base frame and seat suspension shown in FIGS. 1–3.

Now referring to the drawings, there is illustrated in FIGS. 1–4 a base frame 10 comprising a pair of laterally spaced side frames 12 joined together by front and rear cross members 14, 16. The frame 10 is adapted to be supported on a supporting surface by a pair of rear drive wheels and a pair of front casters, neither of which are shown. The drive wheels are differentially operable to move and guide the frame 10. The frame 10, in turn, is adapted to support a seat frame, such as the seat frame 17 shown. The seat frame 17 is adapted to support a sling, which is not shown. The sling is adapted to support a wheel occupant.

Figure 5:
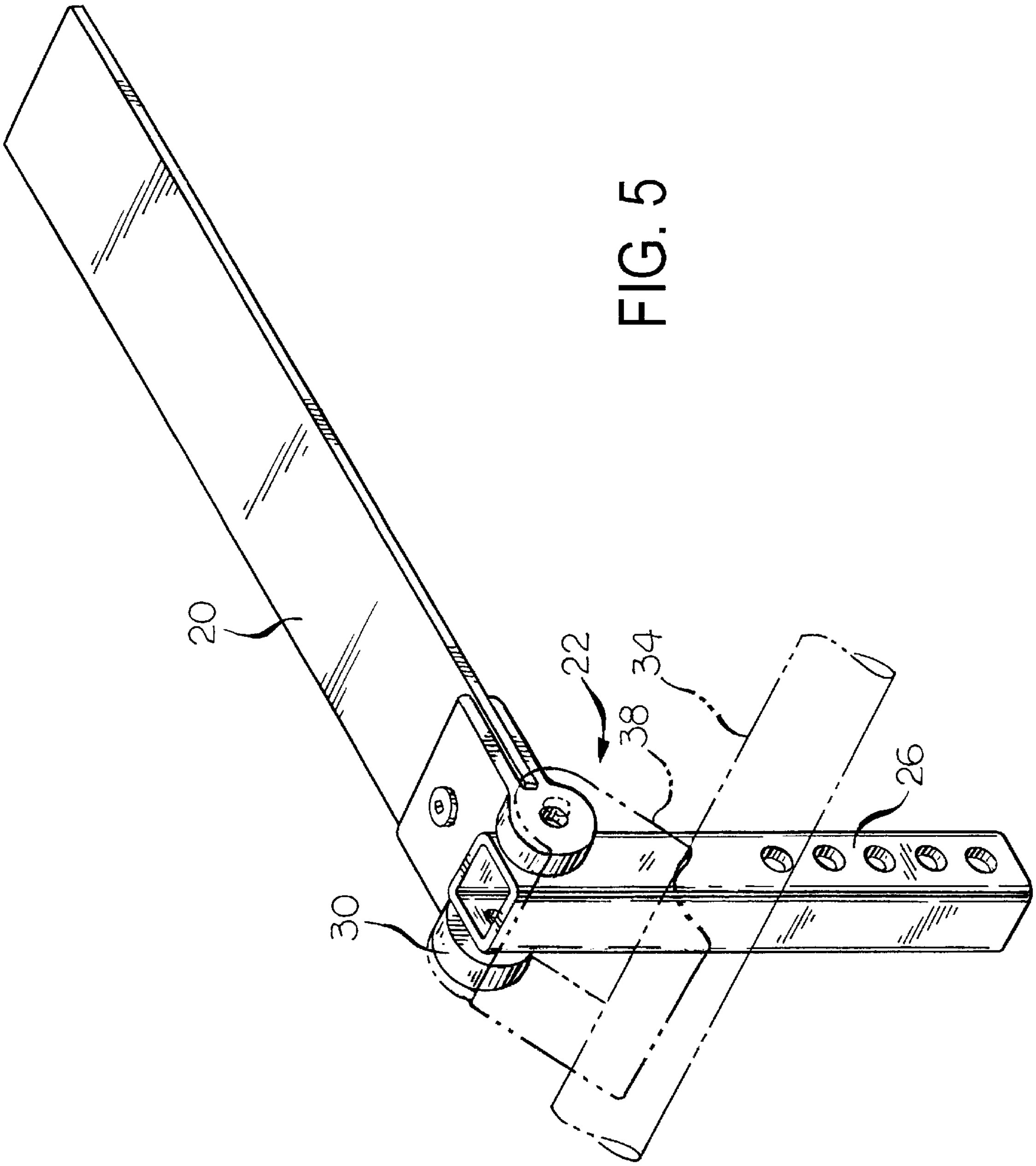
FIG. 5 is a perspective view of the seat suspension shown in FIGS. 1–4.
Figure 6:
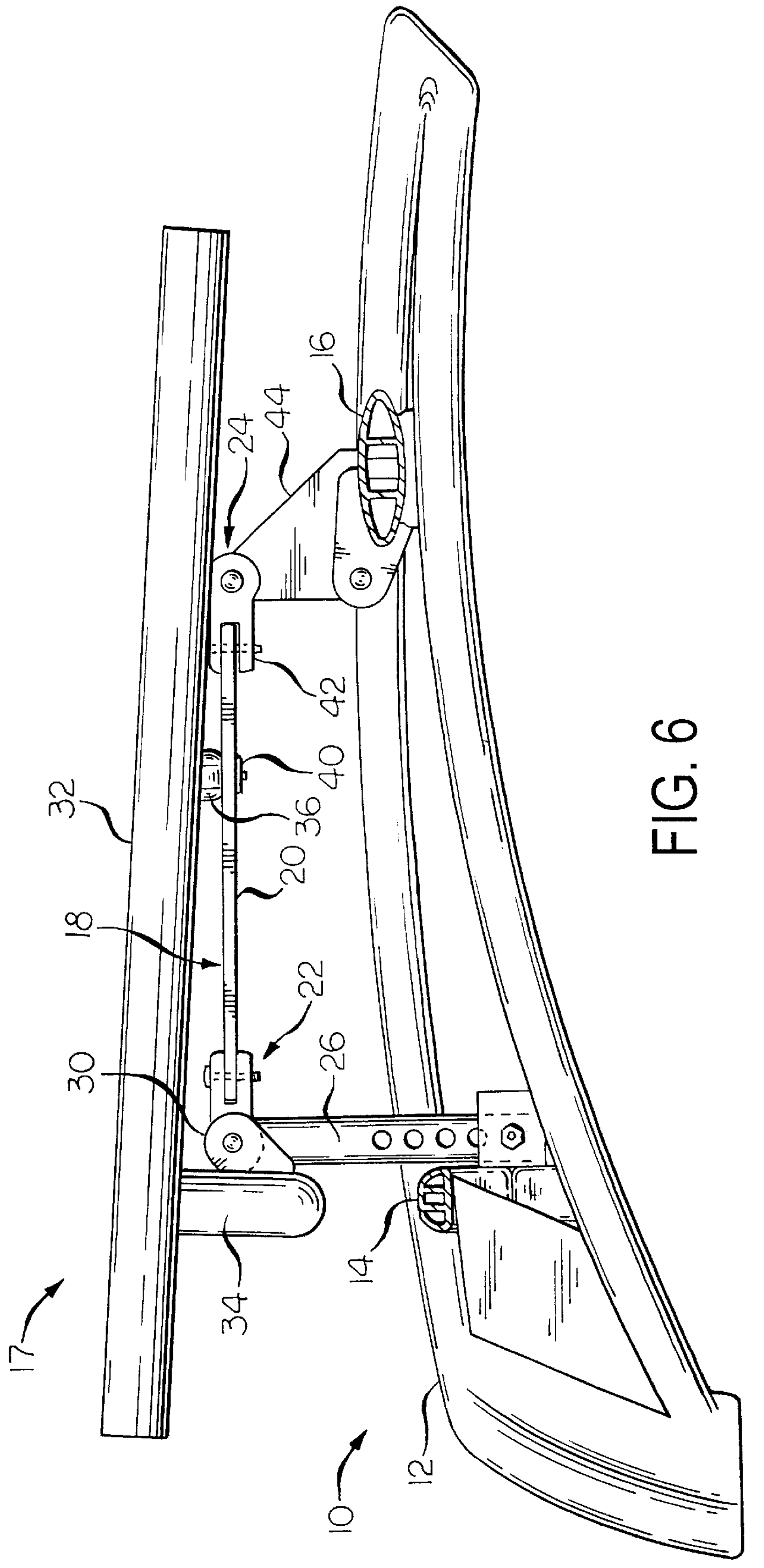
FIG. 6 is a sectional view of an alternative seat suspension.
Figure 7:
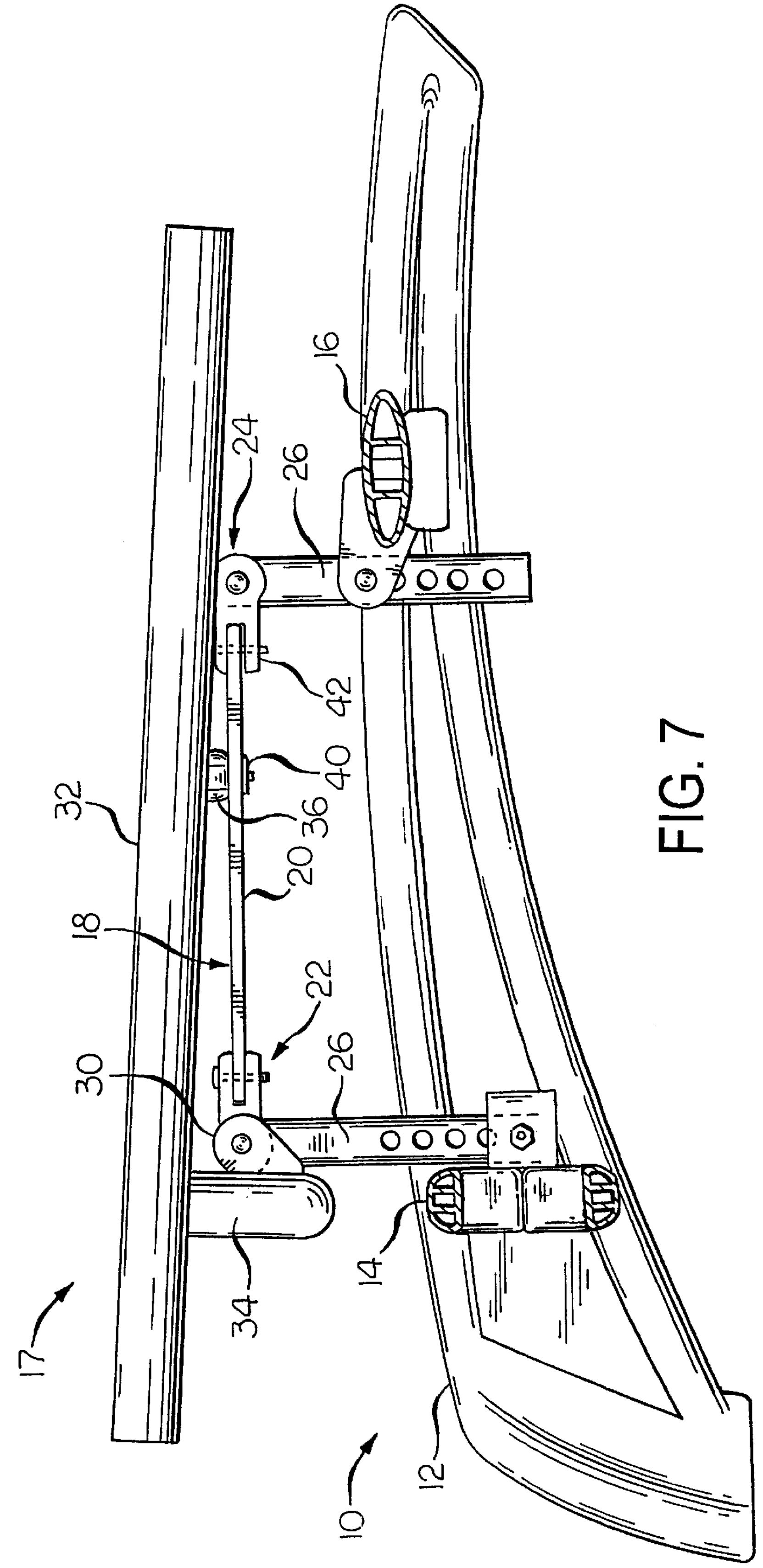
FIG. 7 is a side elevational view of another base frame and seat suspension according to the invention.

In accordance with the present invention, the seat frame 17 is supported by a seat suspension 18, which is also shown in FIG. 5. The suspension 18 includes one or more springs 20. The springs 20 are preferably elongated, such as the leaf springs shown, and preferably extend longitudinally. It is most preferable that a pair of laterally spaced, horizontally disposed springs 20 be provided.

The springs 20 preferably extend between front and rear portions of the frame 10. As shown in the drawings, the springs 20 are joined to the front and rear cross members 14, 16. Although it is preferred that the springs 20 be joined to the front and rear cross members 14, 16, it is conceivable that the springs 20 be joined elsewhere relative to front and rear portions of the side frames 12.

The springs 20 may be joined to the front and rear cross members 14, 16 in any suitable manner. In the preferred embodiment of the invention, support members 22, 24 are supported by the front and rear cross members 14, 16. The front cross member 14 preferably supports a pair of laterally spaced front support members 22. The front support members 22 shown are in the form of receivers, such as the tubular sleeves or sockets shown. The rear cross member 16 likewise preferably supports a pair of laterally spaced rear support members 24. In one embodiment of the invention, these rear support members 24 are receivers in the form of yokes or channel members.

It is preferred that at least one pair of the support members 22, 24 permits a portion of the springs 20 to be adjusted in elevation. One pair of the support members 22, 24 may permit movement of a portion of the springs 20. As shown in the drawings, the front support members 22 permit a front portion of the springs 20 to be adjusted in elevation. The rear support members 24 may permit linear or axial movement of a rear portion of the springs 20. Alternatively, the rear portion of the springs 20 may be secured tightly in the rear support members 24 to prevent the springs 20 from moving relative to the rear support members 24. This may be accomplished in any suitable manner. For example, coaligning apertures may be provided in the springs 20 and the rear support members 24 and fasteners may be secured through the apertures to secure the springs 20 relative to the rear support members 24.

The front support members 22 may be comprised of upright extending tubular members joined to the front cross member 14. The tubular members are adapted to receive mating members 26. The mating members 26 are adapted to be movable relative to the front support members 22 to permit adjustment of the elevation of front portions of the springs 20. Once adjusted to a desired elevation, the mating members 26 may be secured in place relative to the front support members 22.

The mating members 26 may be secured in any suitable manner. One manner in which the mating members 26 may be secured is with a fastener, that is adapted to engage a hole in the front support members 22 and one of a plurality of holes 28 in the mating members 26. The holes 28 are preferably spaced discrete distances apart to permit the front portion of the springs 20 to be adjusted to discrete levels of elevation.

In the preferred embodiment of the invention, the mating members 26 are movably supported relative to the front portion of the springs 20. This may be accomplished by coupling the mating members 26 to the springs 20 with pivotal couplings, such as the hinges 30 shown. The hinges 30 permit the mating members 26 and the springs 20 to pivot relative to one another as the mating members 26 are adjusted. This permits the angular disposition of the springs 20 relative to the mating members 26 to be varied with relative ease to permit the inclination of the seat frame 17 to be adjusted with relative ease.

As stated above, the rear support members 24 may be in the form of channels. The rear support members 24 are joined in a laterally spaced relation to the rear cross member 16. The rear support members 24 extend longitudinally so as to be oriented to receive the springs 20. The rear support members 24 are preferably shaped within a close tolerance of the springs 20 to reduce the risk that the springs 20 will rattle. As stated above, the rear support members 24 may be dimensioned to permit the rear portions of the springs 20 to move relative to the rear support members 24.

Movement of the springs 20 in a longitudinal direction relative to the rear support members 24 may be permitted to enable the springs 20 to have greater flexibility in a substantially vertical direction. Obviously, the springs 20 are formed from a resilient material and thus have a flexible component. However, the slightly loose fit provided between the rear portion of the springs 20 and the rear support members 24 could permit less inhibited flexibility of the springs 20.

It should be noted that the movement of the springs 20 in a longitudinal direction relative to the rear support members 24 is preferably limited. Limiting the movement of the springs 20 in a longitudinal direction reduces the risk of the springs 20 becoming disengaged from the rear support members 24. This helps to ensure that the springs 20 provide support for the seat frame 17 sufficient to support a wheelchair occupant.

The amount of flexibility provided by the springs 20 is preferably limited to absorb shock sustained by the base frame 10 as the drive wheels and casters traverse rough terrain or obstacles. For example, providing about 1/4 inch of flexibility in a substantially vertical direction may be sufficient to absorb shock sustained by the base frame 10. Any greater flexibility may result in undesirable rocking of the seat frame 17.

The flexibility of the springs 20 is determined by various considerations, including the load supported by the springs 20. The load supported by the springs 20 is dependent upon the weight to the seat and the wheelchair occupant. Obviously, the material composition as well as the thickness of the springs 20 may be varied according to the load supported by the springs 20.

Although the preferred embodiment of the invention is provided to absorb shock, it is conceivable that the springs 20 could provide greater flexibility, such as to permit the seat frame 17 to rock, if a rocking seat is desired. Obviously, the flexibility of the springs 20 may be controlled by varying the material composition and thickness of the springs 20 to control the amount in which the seat rocks.

The seat frame 17 may be coupled to the seat suspension 18 in any suitable manner. For example, the seat frame 17 shown includes a pair of laterally spaced tubes 32 joined together by front and rear cross members 34, 36. The front cross member 34 may be coupled towards a front portion of the springs 20 and the rear cross member 36 may be coupled towards a rear portion of the springs 20.

In one embodiment of the invention, a pair of laterally spaced front coupling elements 38 are supported by the front cross member 34 of the seat frame 17. The front coupling elements 38 are preferably in the form of yokes, which are adapted to receive respective mating members 26 and be pivotally joined thereto by a pivot pin 39. A pair of laterally spaced rear coupling elements 40 are similarly supported by the rear cross member 36 of the seat frame 17. The rear coupling elements 40 may be in the form of channel members that are adapted to receive the springs 20. The channel members may be dimensioned to permit the springs to move therein or may hold the springs 20 in a fixed position.

The present invention is not intended to be limited to the seat frame 17 or the particular seat suspension 18 shown. Moreover, the invention is not intended to be limited to the particular manner in which the seat frame 17 is attached. For example, it is conceivable that rear portions of the springs 20 may be pivotally connected towards a rear portion of the base frame 10. This may be accomplished in any suitable manner. For example, the springs 20 may engage rear support members 42, such as the channels described above. A pair of laterally spaced brackets 44 may be supported by the rear cross member 16. The rear support members 42 may be pivotally coupled to the brackets 44, such as by a pivot pin. Although not shown, the rear portion of the springs 20 may be coupled to the base frame 10 in a manner similar to that of the front portions to permit the elevation of the rear portions of the springs 20 to be adjusted. In this way, the front and rear portions of the springs 20 may pivot and be adjustable in elevation.

It is also conceivable that the seat frame 17 may be coupled to the springs 20 with adjustable couplings, such as coupling elements similar to the rear coupling elements 40 described above, which permit the seat frame 17 to be adjusted longitudinally along the springs 20. This would permit the center of gravity of the wheelchair occupant to be adjusted.

In operation, the seat suspension 18 is supported by the base frame 10 by inserting the rear portion of the springs 20 into the rear support members 24 and inserting the mating members 26 into the front support members 22. Alternatively, the rear portions of the springs 20 may be supported by pivotally coupling the rear support members 42 to the brackets 44. The mating members 26 may be movable relative to the support members 42 to a desired position and then secured in place by fasteners to permit the inclination of the seat frame 17 to be adjusted as desired. According to one embodiment of the invention, the rear portion of the springs 20 may be adjustable in elevation to permit the entire elevation of the seat frame 17 to be adjusted. After the seat frame 17 is adjusted as desired, the center of gravity of the wheelchair occupant may be adjusted accordingly, as permitted by another embodiment of the invention. With the wheelchair occupant in the seat frame 17, the springs 20 flex as the wheelchair traverses rough terrain or obstacles to absorb shock that would otherwise be sustained by the seat in the absence of a resilient seat suspension. As the springs 20 flex, a front portion of the seat frame 17 may pivot at the front coupling elements 38 while a rear portion of the seat frame 17 moves with the flexing springs 20. According to one embodiment of the invention, a rear portion of the springs 20 may pivot at the bracket 44.

It should be noted that other springs may be provided, such as laterally extending and longitudinally spaced springs. Laterally extending springs may extend between the side frames 12.

Although the springs 20 are depicted as substantially flat elongate members, other springs may be suitable for carrying out the invention. The invention is also not intended to be limited to the support members 22, 24, 42 shown. Other support members may be suitable for carrying out the instant invention. Moreover, the invention is not intended to be limited to the manner in making adjustments in elevation of the springs 20 shown. Other manners of adjustment may be suitable for carrying out the invention.

It should further be understood that other elements may be substituted in the place of the hinges 30. Moreover, the hinges 30 may be eliminated and the mating members 26 may be fixed relative to the springs 20. Adjustment of such fixed mating members 26 may result in pre-loading the springs 20 while at the same time providing an adjustment in the inclination of the seat frame 17.

It should also be understood that the substantially fixed rear support members 24 may be used in place of the pivotal front support members 22. That is to say, the fixed rear support members 24 may be joined to the front cross member 14 to support the front portion of the springs 20 in a non-pivotal manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A suspension for coupling a seat to a wheelchair frame, said suspension comprising:

at least one substantially horizontally disposed, elongate longitudinally extending spring, a front support member for supporting a first portion of said spring relative to a front portion of the wheelchair frame;

a rear support member for supporting a second portion of said spring relative to a rear portion of the wheelchair frame;

a front coupling member for coupling the first portion of the seat to said spring; and a rear coupling member for coupling the second portion of the seat to said spring, wherein said front coupling member is adapted to pivot relative to said front support member.

2. The suspension according to claim 1, wherein a front portion of said spring is movable relative to said front support member so that said front portion of said spring is adjustable in elevation.

3. A suspension for coupling a seat to a wheelchair frame, said suspension comprising:

at least one substantially horizontally disposed, elongate longitudinally extending spring, a front support member for supporting a first portion of said spring relative to a front portion of the wheelchair frame;

a rear support member for supporting a second portion of said spring relative to a rear portion of the wheelchair frame;

a front coupling member for coupling the first portion of the seat to said spring; and a rear coupling member for coupling the second portion of the seat to said spring, wherein a rear portion of said spring is adapted to pivot relative to said rear support member and a rear portion of said spring is movable relative to said rear support member so that said rear portion of said spring is adjustable in elevation.

4. A suspension for coupling a seat frame to a wheelchair base frame, said suspension comprising:

a pair of laterally spaced springs;

a pair of laterally spaced front support members adapted to be supported towards a front portion of the base frame, said front support members for supporting a front portion of said springs relative to the base frame, said front portion of each said spring being adapted to pivot relative to a respective one of each said front support members;

a pair of laterally spaced rear support members adapted to be supported towards a rear portion of the base frame, said rear support members for supporting a rear portion of said springs relative to the base frame;

a front coupling member for coupling a front portion of the seat to said front portion of said spring, each said front coupling member being adapted to pivot relative to a respective one of said front support members; and a rear coupling member for coupling a rear portion of the seat to said rear portion of said spring, wherein said front portion of each said spring is movable relative to a respective one of said front support members so that said front portion of each said spring is adjustable in elevation.

5. A suspension for coupling a seat frame to a wheelchair base frame, the seat frame and the base frame each comprising front and rear cross members, said suspension comprising:

a pair of laterally spaced, substantially horizontally disposed, elongate springs;

a pair of laterally spaced front support members adapted to be supported by the front cross member of the base frame, said front support members for supporting a front portion of said springs relative to said base frame;

a pair of laterally spaced rear support members adapted to be supported by the rear cross member of the base frame, said rear support members for supporting a rear portion of said springs relative to the base frame;

a front coupling member for coupling a front portion of the seat to said front portion of said spring;

a rear coupling member for coupling a rear portion of the seat to said rear portion of said spring;

a pair of front mating members, said front portion of each said spring having pivotally coupled thereto a respective one of said front mating members; and a pair of rear mating members, said rear portion of each said spring having pivotally coupled thereto a respective one of said rear mating members, wherein said front and rear support members are receivers, each said mating member being movably inserted in a respective one of said receivers so that said mating members are adjustable in elevation relative to said receivers, said mating members being adapted to be secured in place relative to said receivers.

6. The suspension according to claim 5, wherein each said front coupling member is adapted to pivot relative to a respective one of said front support members.

* * * * *